United States Patent
Raj et al.

(10) Patent No.: US 12,237,989 B2
(45) Date of Patent: Feb. 25, 2025

(54) ROUTE AGGREGATION FOR VIRTUAL DATACENTER GATEWAY

(71) Applicant: VMware LLC, Palo Alto, CA (US)

(72) Inventors: Anantha Mohan Raj, Bengaluru (IN); Chandan Ghosh, Bengaluru (IN); Manoj Viswanath Mohan, Bengaluru (IN); Subhankar Paul, Bengaluru (IN)

(73) Assignee: VMware LLC, Palo Alto, CA (US)

(*) Notice: Subject to any disclaimer, the term of this patent is extended or adjusted under 35 U.S.C. 154(b) by 420 days.

(21) Appl. No.: 17/852,917

(22) Filed: Jun. 29, 2022

(65) Prior Publication Data

US 2024/0007386 A1    Jan. 4, 2024

(51) Int. Cl.
*H04L 12/28*    (2006.01)
*H04L 41/02*    (2022.01)
(Continued)

(52) U.S. Cl.
CPC .............. *H04L 45/02* (2013.01); *H04L 41/02* (2013.01); *H04L 41/0893* (2013.01); *H04L 45/245* (2013.01)

(58) Field of Classification Search
CPC ..... H04L 45/02; H04L 41/02; H04L 41/0893; H04L 45/245; H04L 41/0895
(Continued)

(56) References Cited

U.S. PATENT DOCUMENTS

| 8,830,835 B2 | 9/2014 | Casado et al. |
| 8,964,767 B2 | 2/2015 | Koponen et al. |

(Continued)

FOREIGN PATENT DOCUMENTS

| CN | 101977156 A | 2/2011 |
| CN | 111478850 A | 7/2020 |

(Continued)

OTHER PUBLICATIONS

Non-Published Commonly Owned U.S. Appl. No. 18/235,869, filed Aug. 20, 2023, 50 pages, VMware, Inc.

(Continued)

*Primary Examiner* — Phuongchau Ba Nguyen
(74) *Attorney, Agent, or Firm* — Quarles & Brady LLP

(57) ABSTRACT

Some embodiments provide a method for configuring a gateway router of a virtual datacenter. The method is performed at a network management component of a virtual datacenter that is defined in a public cloud and comprises a set of network management components and a set of network endpoints connected by a logical network managed by the network management components of the virtual datacenter. The method receives a set of network addresses of the network endpoints. The method aggregates at least a subset of the network addresses into a single subnet address that encompasses all of the aggregated network addresses. The method provides an aggregated route for the subset of network addresses to a gateway router that connects the virtual datacenter to a public cloud underlay network in order for the router to route data messages directed to the network endpoints to the logical network of the virtual datacenter.

22 Claims, 6 Drawing Sheets

(51) Int. Cl.
   *H04L 41/0893* (2022.01)
   *H04L 45/02* (2022.01)
   *H04L 45/24* (2022.01)
(58) Field of Classification Search
   CPC .............. H04L 45/00; H04L 29/0653; H04L 49/3009; H04L 47/10; H04L 29/06
   See application file for complete search history.

(56) References Cited

U.S. PATENT DOCUMENTS

| | | | |
|---|---|---|---|
| 9,137,052 | B2 | 9/2015 | Koponen et al. |
| 9,209,998 | B2 | 12/2015 | Casado et al. |
| 9,288,081 | B2 | 3/2016 | Casado et al. |
| 9,444,651 | B2 | 9/2016 | Koponen et al. |
| 9,755,960 | B2 | 9/2017 | Moisand et al. |
| 9,876,672 | B2 | 1/2018 | Casado et al. |
| 9,935,880 | B2 | 4/2018 | Hammam et al. |
| 10,091,028 | B2 | 10/2018 | Koponen et al. |
| 10,193,708 | B2 | 1/2019 | Koponen et al. |
| 10,735,263 | B1 | 8/2020 | McAlary et al. |
| 10,754,696 | B1 | 8/2020 | Chinnam et al. |
| 10,931,481 | B2 | 2/2021 | Casado et al. |
| 11,005,710 | B2 | 5/2021 | Garg et al. |
| 11,005,963 | B2 | 5/2021 | Maskalik et al. |
| 11,171,878 | B1 | 11/2021 | Devireddy et al. |
| 11,212,238 | B2 | 12/2021 | Cidon et al. |
| 11,240,203 | B1 | 2/2022 | Eyada |
| 11,362,992 | B2 | 6/2022 | Devireddy et al. |
| 11,582,147 | B2 | 2/2023 | Raman et al. |
| 11,606,290 | B2 | 3/2023 | Patel et al. |
| 11,729,094 | B2 | 8/2023 | Arumugam et al. |
| 11,729,095 | B2 | 8/2023 | Sadasivan et al. |
| 2004/0223491 | A1* | 11/2004 | Levy-Abegnoli ....... H04L 61/35 370/389 |
| 2006/0133265 | A1* | 6/2006 | Lee ..................... H04L 12/4641 370/228 |
| 2007/0058604 | A1 | 3/2007 | Lee et al. |
| 2008/0159150 | A1 | 7/2008 | Ansari |
| 2009/0003235 | A1 | 1/2009 | Jiang |
| 2009/0296713 | A1 | 12/2009 | Kompella |
| 2009/0307713 | A1 | 12/2009 | Anderson et al. |
| 2011/0126197 | A1 | 5/2011 | Larsen et al. |
| 2011/0131338 | A1 | 6/2011 | Hu |
| 2012/0054624 | A1 | 3/2012 | Owens, Jr. et al. |
| 2012/0110651 | A1 | 5/2012 | Biljon et al. |
| 2013/0044641 | A1 | 2/2013 | Koponen et al. |
| 2013/0044751 | A1 | 2/2013 | Casado et al. |
| 2013/0044752 | A1 | 2/2013 | Koponen et al. |
| 2013/0044761 | A1 | 2/2013 | Koponen et al. |
| 2013/0044762 | A1 | 2/2013 | Casado et al. |
| 2013/0044763 | A1 | 2/2013 | Koponen et al. |
| 2013/0044764 | A1 | 2/2013 | Casado et al. |
| 2013/0142203 | A1 | 6/2013 | Koponen et al. |
| 2013/0185413 | A1 | 7/2013 | Beaty et al. |
| 2013/0283364 | A1 | 10/2013 | Chang et al. |
| 2014/0282525 | A1 | 9/2014 | Sapuram et al. |
| 2014/0334495 | A1 | 11/2014 | Stubberfield et al. |
| 2014/0376367 | A1 | 12/2014 | Jain et al. |
| 2015/0113146 | A1 | 4/2015 | Fu |
| 2015/0193246 | A1 | 7/2015 | Luft |
| 2016/0105392 | A1 | 4/2016 | Thakkar et al. |
| 2016/0127202 | A1 | 5/2016 | Dalvi et al. |
| 2016/0170809 | A1 | 6/2016 | Schmidt et al. |
| 2016/0182336 | A1 | 6/2016 | Doctor et al. |
| 2016/0234161 | A1* | 8/2016 | Banerjee ................. H04L 67/10 |
| 2017/0033924 | A1 | 2/2017 | Jain et al. |
| 2017/0063673 | A1 | 3/2017 | Maskalik et al. |
| 2017/0195517 | A1 | 7/2017 | Seetharaman et al. |
| 2017/0353351 | A1 | 12/2017 | Cheng et al. |
| 2018/0062917 | A1* | 3/2018 | Chandrashekhar ......... H04L 41/0806 |
| 2018/0270308 | A1 | 9/2018 | Shea et al. |
| 2018/0287902 | A1 | 10/2018 | Chitalia et al. |
| 2018/0295036 | A1 | 10/2018 | Krishnamurthy et al. |
| 2018/0332001 | A1 | 11/2018 | Ferrero et al. |
| 2019/0068500 | A1 | 2/2019 | Hira |
| 2019/0104051 | A1 | 4/2019 | Cidon et al. |
| 2019/0104413 | A1 | 4/2019 | Cidon et al. |
| 2019/0149360 | A1 | 5/2019 | Casado et al. |
| 2019/0149463 | A1 | 5/2019 | Bajaj et al. |
| 2019/0327112 | A1 | 10/2019 | Nandoori et al. |
| 2019/0342179 | A1 | 11/2019 | Barnard et al. |
| 2020/0235990 | A1* | 7/2020 | Janakiraman ....... H04L 41/0893 |
| 2021/0067375 | A1 | 3/2021 | Cidon et al. |
| 2021/0067439 | A1 | 3/2021 | Kommula et al. |
| 2021/0067468 | A1 | 3/2021 | Cidon et al. |
| 2021/0075727 | A1 | 3/2021 | Chen et al. |
| 2021/0112034 | A1 | 4/2021 | Sundararajan et al. |
| 2021/0126860 | A1 | 4/2021 | Ramaswamy et al. |
| 2021/0136140 | A1 | 5/2021 | Tidemann et al. |
| 2021/0184898 | A1 | 6/2021 | Koponen et al. |
| 2021/0314388 | A1 | 10/2021 | Zhou et al. |
| 2021/0336886 | A1 | 10/2021 | Vijayasankar et al. |
| 2021/0359948 | A1 | 11/2021 | Durrani et al. |
| 2021/0409303 | A1* | 12/2021 | Pande ................. H04L 12/4641 |
| 2022/0094666 | A1 | 3/2022 | Devireddy et al. |
| 2022/0311707 | A1 | 9/2022 | Patel et al. |
| 2022/0311714 | A1 | 9/2022 | Devireddy et al. |
| 2022/0377009 | A1 | 11/2022 | Raman et al. |
| 2022/0377020 | A1 | 11/2022 | Sadasivan et al. |
| 2022/0377021 | A1 | 11/2022 | Sadasivan et al. |
| 2023/0006920 | A1 | 1/2023 | Arumugam et al. |
| 2023/0006941 | A1 | 1/2023 | Natarajan et al. |
| 2023/0239238 | A1 | 7/2023 | Patel et al. |

FOREIGN PATENT DOCUMENTS

| | | | | |
|---|---|---|---|---|
| CN | 114531389 | A * | 5/2022 | ............. H04L 45/74 |
| WO | 2013026050 | A1 | 2/2013 | |
| WO | 2022060464 | A1 | 3/2022 | |
| WO | 2022250735 | A1 | 12/2022 | |

OTHER PUBLICATIONS

Non-Published Commonly Owned U.S. Appl. No. 18/235,874, filed Aug. 20, 2023, 69 pages, VMware, Inc.
Non-Published Commonly Owned U.S. Appl. No. 17/212,662, filed Mar. 25, 2021, 37 pages, VMware, Inc.
Non-published commonly owned U.S. Appl. No. 17/344,956, filed Jun. 11, 2021, 61 pages, VMware, Inc.
Non-published commonly owned U.S. Appl. No. 17/344,958, filed Jun. 11, 2021, 62 pages, VMware, Inc.
Non-published commonly owned U.S. Appl. No. 17/344,959, filed Jun. 11, 2021, 61 pages, VMware, Inc.
Non-Published Commonly Owned U.S. Appl. No. 17/365,960, filed Jul. 1, 2021, 32 pages, VMware, Inc.
Non-Published Commonly Owned U.S. Appl. No. 17/366,676, filed Jul. 2, 2021, 32 pages, VMware, Inc.
Non-Published Commonly Owned U.S. Appl. No. 17/839,336, filed Jun. 13, 2022, 50 pages, VMware, Inc.
Non-Published Commonly Owned U.S. Appl. No. 17/845,716, filed Jun. 21, 2022, 32 pages, VMware, Inc.
Non-Published Commonly Owned U.S. Appl. No. 18/119,208, filed Mar. 8, 2023, 46 pages, VMware, Inc.

* cited by examiner

ROUTE AGGREGATION FOR VIRTUAL DATACENTER GATEWAY

BACKGROUND

More and more enterprises have moved or are in the process of moving large portions of their computing workloads into various public clouds (e.g., Amazon Web Services (AWS), Google Cloud Platform (GCP), Microsoft Azure, etc.). If an enterprise uses one of the native offerings of these clouds, and only uses one public cloud for their workloads, then many of these public clouds offer connectivity between the workloads in the different datacenters of the same public cloud provider. For instance, AWS virtual private clouds (VPCs) can be connected via a transit gateway.

However, enterprises might want to use workloads in multiple public clouds as well as their on-premises/branch datacenters that are not as easily all connected without traffic traveling through the public Internet. In addition, some enterprises might want to retain management of their workloads in the cloud, rather than running native cloud provider managed workloads. Solutions that enable these objectives while navigating the limitations imposed by specific cloud providers are therefore desirable.

BRIEF SUMMARY

Some embodiments provide a method for configuring a gateway router that provides connectivity between a virtual datacenter in a public cloud and a set of external datacenters (e.g., on-premises datacenters, other virtual datacenters in the same or different public clouds). Specifically, when the gateway router is implemented according to constraints imposed by the public cloud in which the virtual datacenter resides, some embodiments automatically aggregate network addresses of logical network endpoints in the virtual datacenter into a single subnet address that is used for an aggregated route in the routing table of the gateway router.

The virtual datacenter, in some embodiments, is a datacenter that includes network and/or compute management components operating in the public cloud as well as network endpoints connected by a logical network within the virtual datacenter. The network endpoints as well as the logical network are managed by the management components that operate within the virtual datacenter. The logical network of some embodiments connects to other datacenters via the gateway router that is implemented as part of the public cloud underlay. As such, the routing table for this gateway router is constrained according to rules imposed by the public cloud, such as limiting the number of routes in the routing table.

However, the gateway routing table needs to include routes for each of the network endpoints of the virtual datacenter (i.e., for the network addresses of these endpoints or for the logical switch subnets to which these network endpoints belong) so that the gateway router will route data messages directed to these network endpoints to the virtual datacenter logical network (rather than to other datacenters or to the public Internet). To limit the number of routes needed in the gateway routing table, a network management component of the virtual datacenter receives the network addresses of these network endpoints and automatically aggregates at least a subset of these network addresses into a single subnet address that encompasses the entire subset of the network addresses. Rather than providing individual routes for each network endpoint or logical switch subnet in the subset, the network management component provides a single aggregated route for the subnet address to the routing table of the gateway router.

In some embodiments, the network management component monitors the virtual datacenter (e.g., a compute management component) to determine when new network endpoints are created in the virtual datacenter in order to perform route aggregation. The route aggregation process, in some embodiments, identifies a set of network addresses (for which all of the routes have the same next hop) that share a set of most significant bits in common (e.g., for IPv4 addresses, the first 22 out of 32 bits). The aggregate subnet address uses these shared most significant bits and then the value zero for each of the remaining least significant bits (e.g., in the prior example, the 10 remaining bits). In some embodiments, the process also ensures that no network addresses for which the gateway router routes data messages to other next hops are encompassed by this subnet (e.g., addresses for network endpoints located in an on-premises datacenter). If needed, the network management component generates routes for multiple aggregate subnet addresses to (i) encompass all of the virtual datacenter network endpoints while (ii) ensuring that no other network addresses are encompassed by the aggregate subnet addresses.

The aggregate subnet addresses are not only used by the gateway router in some embodiments but are also provided to connector gateways that are used to connect the virtual datacenter to on-premises datacenters, other virtual datacenters, and/or native virtual private clouds (VPCs) of the public cloud datacenter. The subnet addresses may be provided to these other connector gateways using a routing protocol or through network management connections in different embodiments. In addition, the gateway router also receives network addresses for endpoints located in these other datacenters or VPCs in order to route data messages sent from the virtual datacenter to network endpoints in these other datacenters or VPCs to the correct connector gateway. In some embodiments, the gateway router receives aggregate routes (e.g., for routing to other virtual datacenters) or the network management components of the virtual datacenter perform a similar route aggregation process to aggregate the network addresses for the outbound routes.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for configuring a gateway router that provides connectivity between a virtual datacenter in a public cloud and a set of external datacenters (e.g., on-premises datacenters, other virtual datacenters in the same or different public clouds). Specifically, when the gateway router is implemented according to constraints imposed by the public cloud in which the virtual datacenter resides, some embodiments automatically aggregate network addresses of logical network endpoints in the virtual datacenter into a single subnet address that is used for an aggregated route in the routing table of the gateway router.

The virtual datacenter, in some embodiments, is a datacenter that includes network and/or compute management components operating in the public cloud as well as network endpoints connected by a logical network within the virtual datacenter. The network endpoints as well as the logical network are managed by the management components that operate within the virtual datacenter. The logical network of some embodiments connects to other datacenters via the gateway router that is implemented as part of the public cloud underlay. As such, the routing table for this gateway router is constrained according to rules imposed by the public cloud, such as limiting the number of routes in the routing table.

Figure 1:
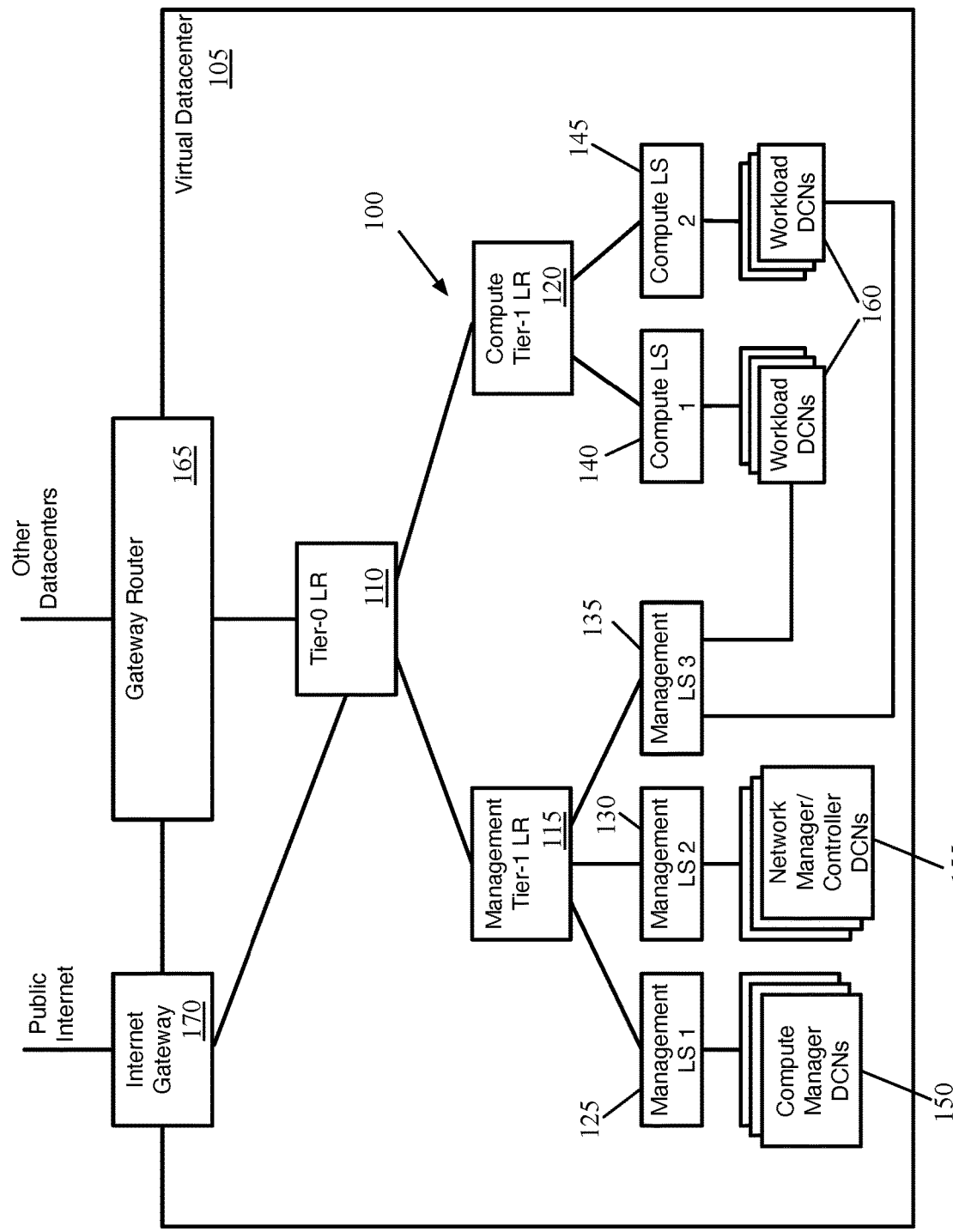
FIG. 1 conceptually illustrates a logical network for a virtual datacenter of some embodiments.

FIG. 1 conceptually illustrates a logical network 100 for a virtual datacenter 105 of some embodiments. As shown, the logical network 100 of the virtual datacenter is defined to include a tier-0 (T0) logical router 110, a management tier-1 (T1) logical router 115, and a compute tier-1 (T1) logical router 120. The T0 logical router 110 handles traffic entering and exiting the virtual datacenter 105 (e.g., traffic sent to other virtual datacenters or physical on-premises datacenters via a connectivity group, traffic between workloads at the virtual datacenter 105 and client devices connected to public networks, etc.). In addition, in some embodiments, some or all traffic between the management portion of the logical network 100 and the network endpoint workload data compute nodes (DCNs) is sent through the T0 logical router 110 (e.g., as a logical path between the management T1 logical router 115 and the compute T1 logical router 120). The T0 logical router 110 may also be defined to provide certain services for data traffic that it processes.

The management and compute T1 logical routers 115 and 120 are sometimes referred to as the management gateway and compute gateway. In some embodiments, a typical virtual datacenter is defined with these two T1 logical routers connected to a T0 logical router, which segregates the management network segments from the compute network segments to which workload DCNs connect. In general, public network traffic from external client devices would not be allowed to connect to the management network but would (in certain cases) be allowed to connect to the compute network (e.g., if the compute network includes web servers for a public-facing application). Each of the T1 logical routers 115 and 120 may also apply services to traffic that it processes, whether that traffic is received from the T0 logical router 110 or received from one of the network segments underneath the T1 logical router.

In this example, the virtual datacenter logical network 100 includes three management logical switches 125-135 (also referred to as network segments) and two compute logical switches 140-145. In this example, one or more compute manager DCNs 150 connect to the first management logical switch 125 and one or more network manager and controller DCNs 155 connect to the second management logical switch 130. The DCNs shown here may be implemented in the public cloud as virtual machines (VMs), containers, or other types of machines, in different embodiments. In some embodiments, multiple compute manager DCNs 150 form a compute manager cluster connected to the logical switch 125, while multiple network manager DCNs 155 form a management plane cluster and multiple network controller DCNs 155 form a control plane cluster (both of which are connected to the same logical switch 130). Via the management gateway 115, the compute manager DCNs 150 can communicate with the network manager and controller DCNs 155 (e.g., to notify the network manager DCNs when new logical network endpoint workloads have been added to the virtual datacenter).

The virtual datacenter 105 also includes logical network endpoint workload DCNs 160. These DCNs can host applications that are accessed by users (e.g., employees of the enterprise that owns and manages the virtual datacenter 105), external client devices (e.g., individuals accessing a web server through a public network), or other DCNs (e.g., in the same virtual datacenter or different datacenters). In some embodiments, at least a subset of the DCNs are related to an application mobility platform (e.g., VMware HCX) that helps deliver hybrid cloud solutions.

The workload DCNs 160 in this example connect to two logical switches 140 and 145 (e.g., because they implement different tiers of an application, or different applications altogether). In some embodiments, workload network endpoint DCNs connect to different logical switches than the application mobility platform DCNs. These DCNs 160 can communicate with each other, with workload DCNs in other datacenters, etc. via the interfaces connected to these compute logical switches 140 and 145. In addition, in some embodiments (and as shown in this example), the workload DCNs 160 include a separate interface (e.g., in a different subnet) that connects to a management logical switch 135. The workload DCNs 160 communicate with the compute and network management DCNs 150 and 155 via this logical switch 135, without requiring this control traffic to be sent through the T0 logical router 110.

The virtual datacenter 105 also includes a gateway router 165 and an internet gateway 170, with the T0 logical router having different interfaces for connecting to each of these routers. The internet gateway 170 handles traffic sent between the workload DCNs 160 and the public Internet (e.g., when external clients communicate with the workload DCNs 160). The gateway router 165 operates to connect the virtual datacenter logical network to (i) on-premises datacenter(s) belonging to the enterprise that manages the virtual datacenter, (ii) additional virtual datacenter(s) in the same public cloud or other public clouds, and/or (iii) native virtual private cloud(s) (VPCs) implemented in the same public cloud or other public clouds. These connections will be described further below by reference to FIG. 3.

Figure 2:
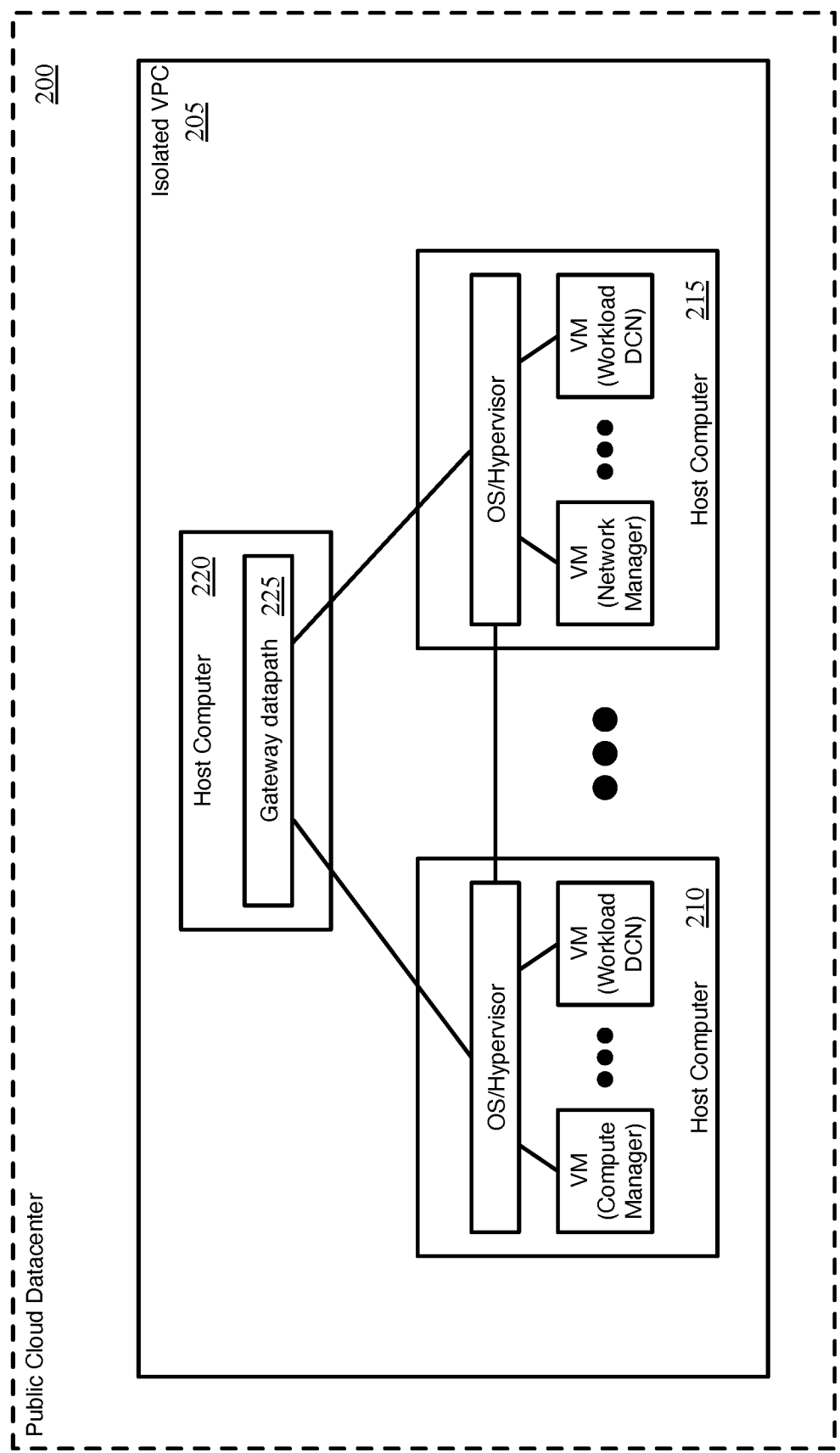
FIG. 2 conceptually illustrates the physical implementation of the virtual datacenter of FIG. 1 in a public cloud datacenter according to some embodiments.

FIG. 2 conceptually illustrates the physical implementation of the virtual datacenter 105 in a public cloud datacenter 200 according to some embodiments. In some embodiments, a virtual datacenter such as that shown in FIG. 1 is implemented within a VPC of a public cloud datacenter. This figure shows that the virtual datacenter 105 is implemented in an isolated VPC 205 of the public cloud datacenter 200. In some embodiments, this VPC 205 is allocated not just a set of VMs or other DCNs that execute on host computers managed by the public cloud provider and potentially shared with other tenants of the public cloud, but rather a set of host computers 210-220 of the public cloud datacenter 200. This allows the management DCNs to manage the hypervisors and other software of the host computers 210-220 (e.g., so that these hypervisors implement the virtual datacenter logical network 100).

In different embodiments, the entire virtual datacenter may be implemented on a single host computer of the public datacenter 200 (which may host many VMs, containers, or other DCNs) or multiple different host computers. As shown, in this example, at least two host computers 210 and 215 execute workload and/or management VMs. Another host computer 220 executes a gateway datapath 225. In some embodiments, this gateway datapath 225 implements a centralized component of the T0 logical router, such that all traffic between any external networks and the virtual datacenter is processed by the gateway datapath 225. Additional details regarding logical routers and their implementation can be found in U.S. Pat. No. 9,787,605, which is incorporated herein by reference.

Figure 3:
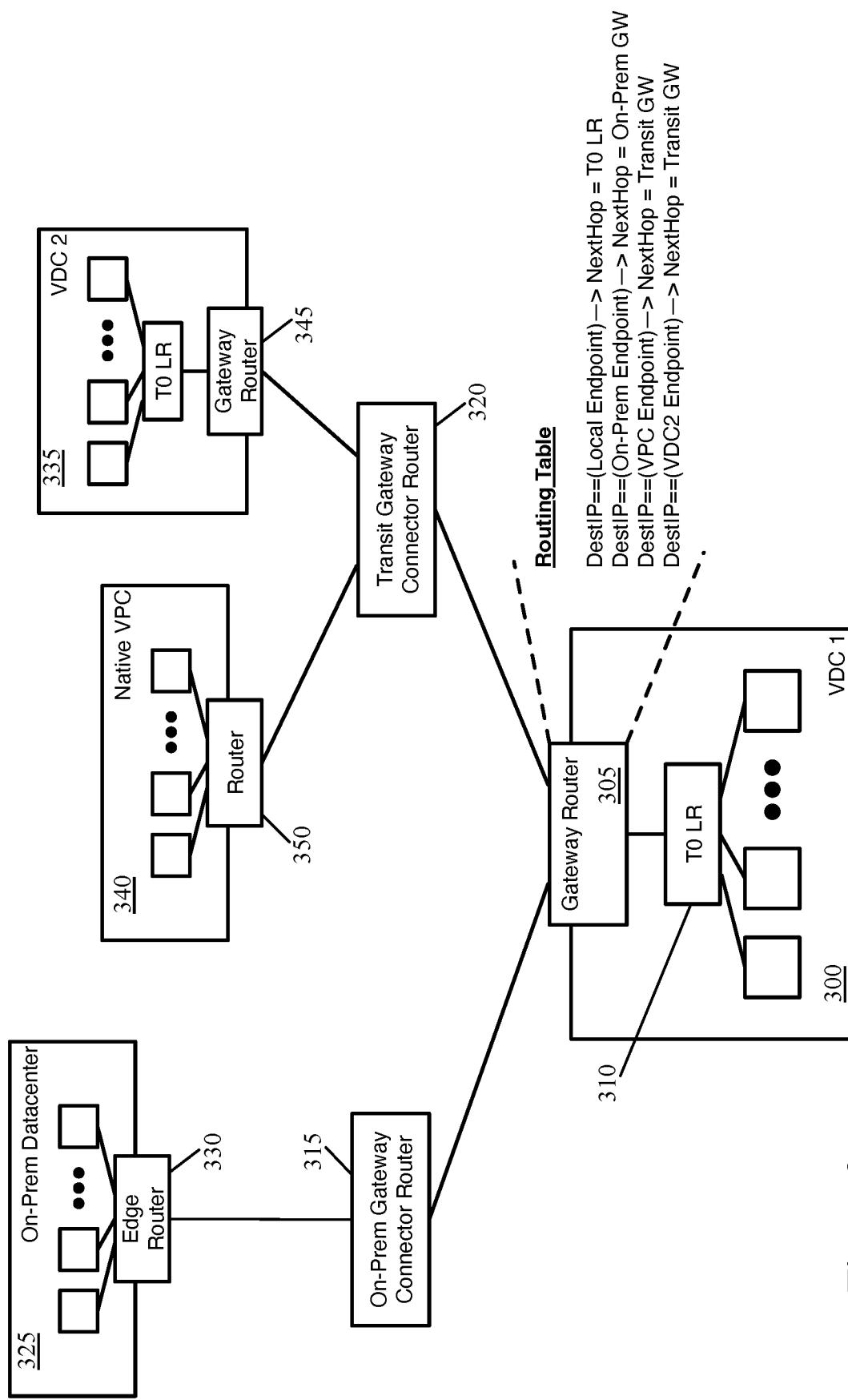
FIG. 3 conceptually illustrates the connectivity of a first virtual datacenter to a set of additional datacenters via its gateway router.

FIG. 3 conceptually illustrates the connectivity of a first virtual datacenter 300 to a set of additional datacenters via its gateway router 305. The first virtual datacenter 300 includes a logical network with a T0 logical router 310 and a set of logical network endpoint workloads, which may be setup as shown in FIG. 1. The T0 logical router 310 includes an outgoing interface to a gateway router 305 (an additional outgoing interface to an Internet gateway is not shown here).

The gateway router 305 includes two outgoing interfaces. One of these interfaces connects to an on-premises gateway connector router 315 and a second interface connects to a transit gateway connector router 320. In some embodiments, both of these connector routers 315 and 320 are implemented in the public cloud provider underlay (i.e., outside of the virtual datacenter 300 but within the public cloud datacenter in which the virtual datacenter is implemented). For instance, when the virtual datacenter 300 is implemented in an Amazon Web Services (AWS) public cloud, the on-premises gateway connector router is an AWS Direct Connect router while the transit gateway connector router is an AWS Transit Gateway router.

As shown, the on-premises gateway connector router 315 enables the virtual datacenter 300 to connect to an on-premises datacenter 325. In some embodiments, the connection between the on-premises gateway connector router 315 and the on-premises datacenter 325 uses a virtual private network (VPN) connection such that traffic between the virtual datacenter 300 and the on-premises datacenter 325 does not pass through the public Internet at any time. In some embodiments, the on-premises gateway connector router 315 enables connection to multiple on-premises and/or branch network private datacenters. In other embodiments, a separate gateway connector router 315 is used for each private datacenter to which the virtual datacenter connects. The on-premises gateway connector router 315 connects to an edge router 330 at the on-premises datacenter 325, and numerous workload DCNs (e.g., VMs, bare metal computing devices, mobile devices, etc.) can communicate with the virtual datacenter through this connection.

The transit gateway connector router 320 enables the virtual datacenter 300 to connect to both (i) another virtual datacenter 335 and (ii) a native VPC 340 of the public cloud. The second virtual datacenter 335 is arranged similarly to the first virtual datacenter (e.g., as shown in FIG. 1), with its own gateway router 345 providing a connection between the logical network endpoint DCNs of the virtual datacenter 335 and the transit gateway connector router. The native VPC 340, in some embodiments, is not a virtual datacenter in that it does not include management components and, in many cases, is not implemented on fully isolated hardware (e.g., the host computers that host DCNs of the VPC may also host DCNs for other VPCs of other public cloud tenants). The native VPC may be managed through a cloud management platform or through a cloud provider platform. In some embodiments, the native VPC hosts services (e.g., load balancers, deep packet inspection, DHCP service, authentication services, endpoint services, etc.) used to process data traffic sent to or from the virtual datacenters 300 and 335. The native VPC 340, in some embodiments, connects to the transit gateway connector router via a router 350 (e.g., a gateway router) of its own.

In this example, the second virtual datacenter 335 and the native VPC 340 are both implemented in the same public cloud datacenter as the first virtual datacenter 300. In other examples, however, the first virtual datacenter 300 may connect to virtual datacenters and/or native VPCs in other public cloud datacenters. For additional discussion regarding these connections, see U.S. patent application Ser. No. 17/212,662, filed Mar. 25, 2021 and titled "Connectivity Between Virtual Datacenters", which is incorporated herein by reference.

As noted, the gateway router 305 needs to be configured to route data messages sent between the logical network endpoints of the first virtual datacenter 300 (as well as, in some cases, the management DCNs) and the other datacenters 325, 335, and 340. The routing table(s) for the gateway router 305 thus include (i) routes for the endpoints located at the first virtual datacenter 300 (with a next hop of the T0 logical router 310), (ii) routes for the endpoints located at the on-premises datacenter 325 (with a next hop interface of the on-premises gateway connector router 315), (iii) routes for the endpoints located at the second virtual datacenter 335 (with a next hop interface of the transit gateway connector router 320), and (iv) routes for the endpoints located at the native VPC 340 (also with a next hop interface of the transit gateway connector router 320).

As noted, however, the routing table of the gateway router 305 is constrained according to rules imposed by the public cloud. For instance, in some embodiments the public cloud limits the number of routes that can be programmed into the routing table (e.g., 20 routes, 100 routes, etc.). However, the number of workloads at any of the datacenters will often easily exceed these numbers, and thus the routing table cannot accommodate an individual route for each network endpoint. In many cases, the network endpoints are organized by logical switches that each have their own subnet and thus a route is provided for each logical switch. However, the number of logical switches can still far exceed the maximum number of allowed routes for the gateway router in many deployments.

To limit the number of routes needed in the gateway routing table, some embodiments automatically aggregate the network addresses of the network endpoints into one or more aggregate subnet addresses that each encompasses multiple network endpoints (and, typically, multiple logical switch subnets) at the same location. Rather than configuring individual routes in the gateway routing table for each network endpoint or subnet in a given subset of network addresses, some embodiments configure a single aggregated route for the aggregate subnet.

Figure 4:
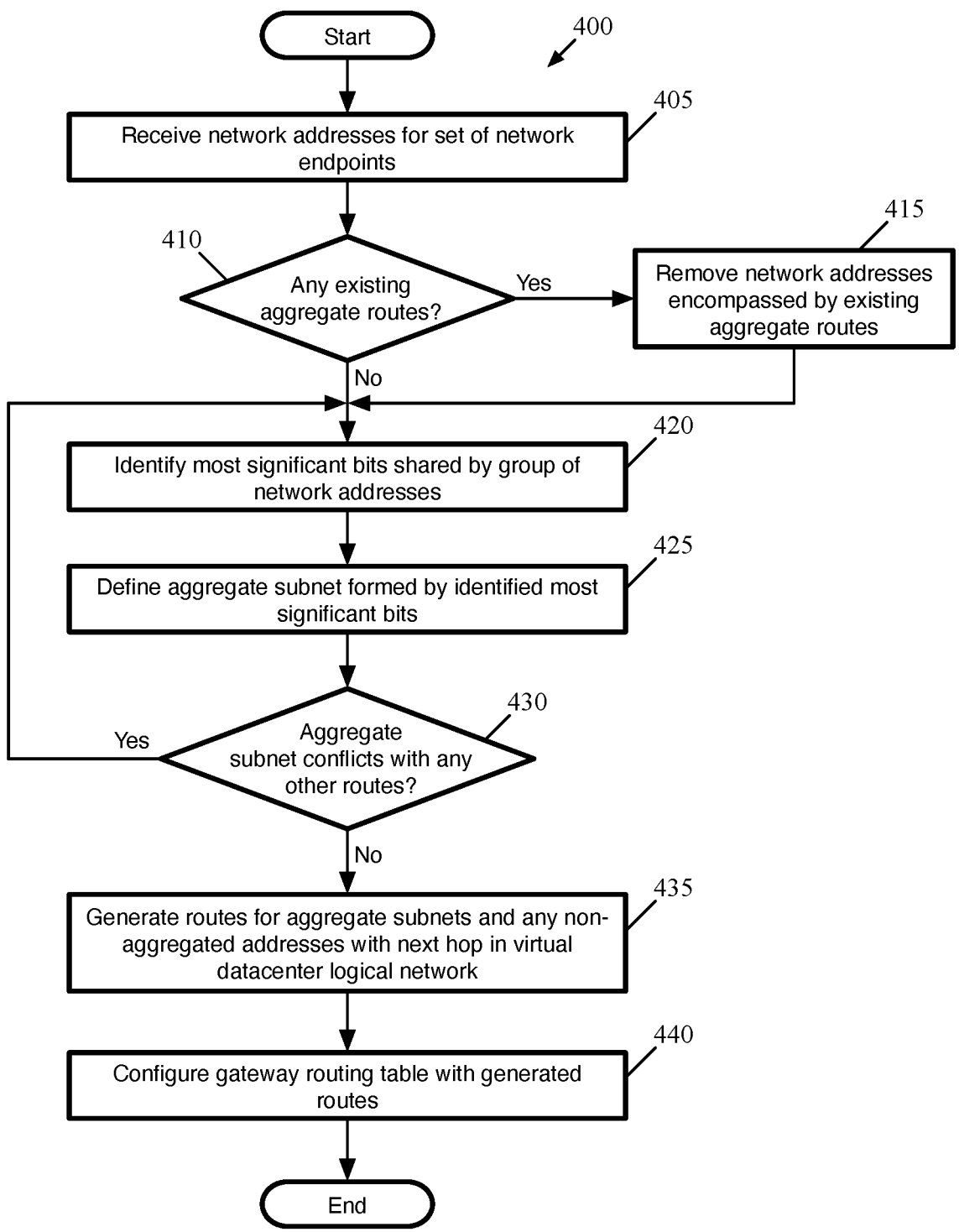
FIG. 4 conceptually illustrates a process of some embodiments for aggregating network addresses for a routing table of a gateway router that connects a virtual datacenter to other datacenters.

FIG. 4 conceptually illustrates a process 400 of some embodiments for aggregating network addresses for a routing table of a gateway router that connects a virtual datacenter to other datacenters. The process 400, in some embodiments, is performed by a network management component of a virtual datacenter (e.g., a network manager DCN operating in the virtual datacenter). The process 400 will be described in part by reference to FIG. 5, which conceptually illustrates an example of aggregating multiple subnet addresses into an aggregated subnet.

As shown, the process 400 begins by receiving (at 405) network addresses for a set of network endpoints. In some embodiments, a scheduler component of the network manager monitors the virtual datacenter (e.g., by communicating with a compute management component) to determine when new network endpoints are created in the virtual datacenter in order to perform route aggregation. The process 400 may be performed when the virtual datacenter is initially set up as well as anytime additional network endpoints are created in the virtual datacenter for which routes need to be added to the routing table. The received network addresses, in some embodiments, can be IPv4 addresses, IPv6 addresses, or other types of network addresses (the described examples will use IPv4 addresses for simplicity, but the principles described can be extended to IPv6 addresses or other similarly-structured types of network addresses). For instance, in IPv4, the received network addresses can be addresses of individual DCNs (e.g., /32 addresses) or subnets associated with logical switches that can include multiple DCNs (e.g., /24 addresses).

Figure 5:
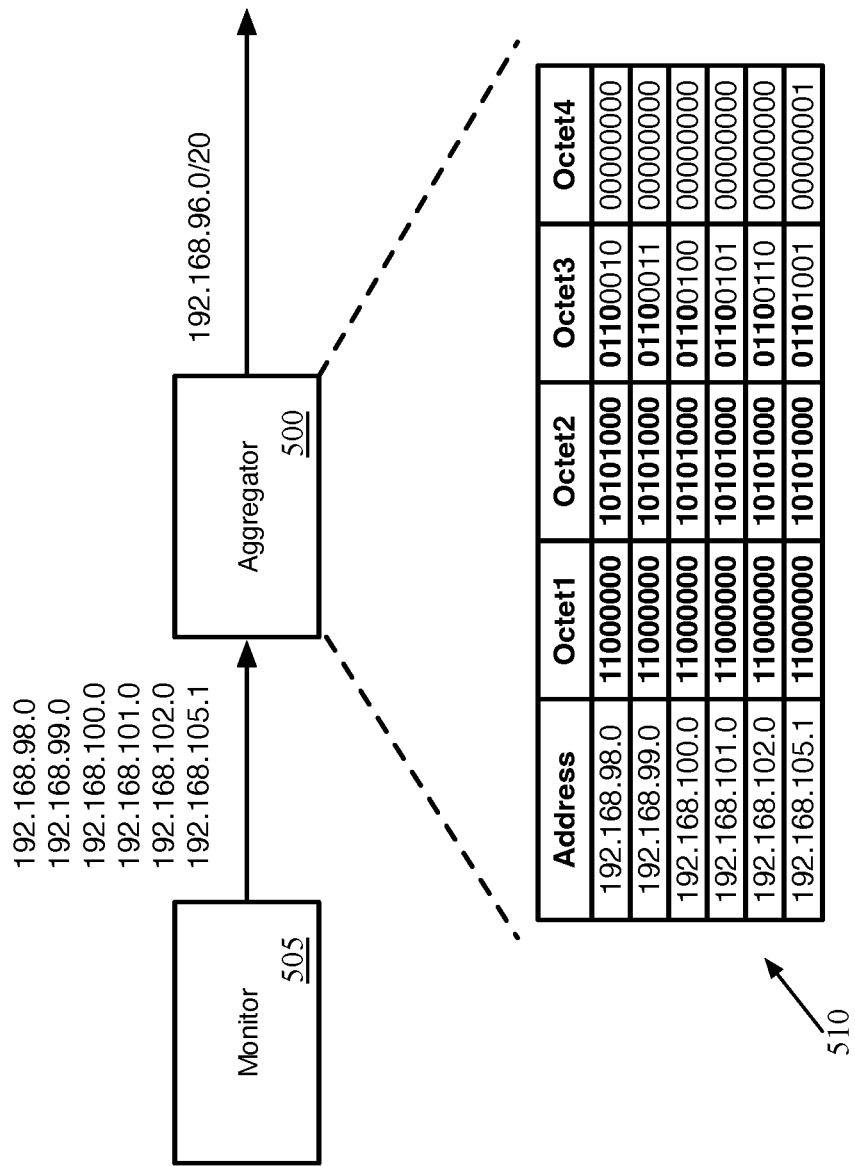
FIG. 5 conceptually illustrates an example of aggregating multiple subnet addresses into an aggregated subnet.

FIG. 5 shows an aggregator 500 and a monitor 505. In some embodiments, these are modules of a network manager or other management component that handles the route aggregation process. The monitor 505, in some embodiments, monitors the network (e.g., via communication with the other modules of the network management system or with a compute manager component) to discover when new network addresses are added to the virtual datacenter for which routes need to be added to the gateway routing table. The aggregator 500 handles the generation of aggregate subnets (i.e., aggregate routes). In this example, the monitor 505 provides the aggregator 500 with 5 IPv4 subnets (each of these being a/24 subnet) as well as a single IPv4 address (192.168.105.1). These subnets are 192.168.98.0, 192.168.99.0, 192.168.100.0, 192.168.101.0, and 192.168.102.0.

Returning to FIG. 4, the process 400 determines (at 410) whether there are any existing aggregate routes already configured for the gateway routing table. These existing aggregate routes can include (i) user-configured aggregate routes and/or (ii) previously-generated aggregate routes. Some embodiments allow the administrator to configure aggregated static routes (e.g., via an interface of the network management and control system). In addition, while at initial setup of the virtual datacenter there will not be any previously-generated aggregate routes, once those aggregate routes exist, they are accounted for when any new routes need to be added to the gateway routing table.

The process 400 then removes (at 415) any of the received network addresses that are encompassed by the existing aggregate routes. Specifically, larger subnets can encompass smaller subnets or individual DCN addresses when the smaller subnet or individual DCN address would match the larger subnet. For instance, an existing route for a /20 IPv4 address encompasses many different /24 addresses (e.g., the address 10.10.0.0/16 encompasses 10.10.5.0/24 and 10.10.6.1 but does not encompass 10.11.0.0/24). It should also be noted that a route for a larger subnet only encompasses a network address if the next hop for the larger subnet route is the same as the next hop would be for a new route for the encompassed network address. For instance, a 10.10.0.0/16 route with a next hop interface pointing to a transit gateway router would not encompass a 10.10.10.0/24 route pointing to the local T0 router (but would create a conflict that would need to be managed). Any network addresses encompassed by the existing aggregate routes can be removed from analysis because they do not need to be further aggregated as they will not add to the size of the routing table.

Though not shown in the figure, if all of the received network addresses are encompassed by existing aggregate routes, then process 400 ends as there is no need to perform additional aggregation analysis. However, if there are not any existing aggregate routes or some of the received addresses are not encompassed by the existing routes, the process 400 performs route aggregation.

To aggregate the routes, the process identifies (at 420) the most significant bits shared by a group of network addresses. In some embodiments, the process starts by grouping all of the addresses and identifying a set of most significant bits shared by all of these addresses. Other embodiments impose an initial requirement that a minimum number of bits must be shared in order to group a set of addresses. At the extreme end, the default route 0.0.0.0/0 would encompass all of the network addresses, but if any egress routes for network addresses in other datacenters exist in the routing table, then this default route would conflict with these routes (though this could be handled by longest prefix match). In addition, a default route pointing outward might already exist for the router. Thus, for instance, some embodiments start with 16 most significant bits (for IPv4 addresses) and only group addresses that share these first 16 bits in common (e.g., all 192.168.x.x subnets). These grouped addresses might share additional bits in common, in which case further most significant bits can be used.

The process 400 then defines (at 425) an aggregate subnet formed by the identified most significant bits. This aggregate subnet, in some embodiments, includes (i) the shared values for the identified most significant bits and (ii) the value zero for each of the remaining least significant bits of the address. The netmask for this aggregated subnet is defined by the number of most significant bits that are shared between the grouped addresses.

FIG. 5 shows how the six addresses are grouped by the aggregator 500. In the table 510 representing these six addresses, the 32 bits for each address are shown (grouped into four octets). Here, the bits shared by all of the addresses are bolded. These are the entirety of the first and second octets (11000000 and 10101000, respectively) as well as the first half of the third octet (0110). The 21$^{st}$ bit varies between the different addresses, and thus cannot be used to group all of these addresses. As such, the address using these 20 shared bits with the remaining 12 bits set to zero is used for the aggregated subnet address with a netmask of 20. As shown, this aggregated subnet address is therefore 192.168.96.0/20.

Next, the process 400 determines (at 430) whether the newly-defined aggregate subnet conflicts with any other existing routes. That is, existing routes should not be encompassed by the aggregate subnet. For instance, in the example shown in FIG. 5, if a route for the subnet 192.168.96.0/24 already existed pointing to the transit gateway connector router, then the aggregate route would conflict with this route. When conflicts exist, these conflicts can be handled differently in different embodiments. For instance, some embodiments rely on longest prefix matching to handle these conflicts. Thus, so long as there are no exact conflicts (e.g., the same subnet being created in multiple datacenters such that the same subnet has routes pointing to two different interfaces), some embodiments ignore the conflict. On the other hand, some embodiments return to 420 and add another significant bit to determine a subnet for a new group and again test for conflicting routes. This group will be smaller by at least one member (because otherwise the initial grouping would have used the additional bit).

It should be noted that the process described in operations 420-430 and shown in FIG. 5 may differ between different embodiments of the invention. For instance, when a large group of network addresses are received, different embodiments group the subnets differently. Some embodiments place all network addresses that share a particular number of most significant bits (e.g., 8 or 16 bits for IPv4) into the same group, then determine how many bits are shared between these network addresses. Other embodiments attempt to find a balance between aggregating as many network addresses as possible and using as long an aggregated subnet (i.e., using more shared bits) as possible. In addition, as already mentioned, different embodiments handle conflicting routes differently. Finally, though not shown in this chart, some embodiments perform operations 420-430 multiple times for different groups of network addresses. The network addresses may be divided into multiple groups due to conflicts with larger groups or a lack of shared address bits.

Once any aggregate subnets have been defined, the process 400 generates (at 435) routes for the aggregate subnets as well as any non-aggregated addresses (either individual addresses or subnets). These routes have their next hop in the virtual datacenter logical network (e.g., the outward-facing interface T0 router that connects to the gateway router). In some embodiments, the routes generated for the gateway router are static routes and thus cannot be aggregated by routing protocol (e.g., BGP) mechanisms. The process 400 also configures (at 440) the routing table of this gateway router with these routes (e.g., via the network management and control system implemented in the virtual datacenter or via interaction with the cloud provider management system). The process 400 then ends.

The aggregate subnet addresses are not only used by the gateway router in some embodiments. Referring to FIG. 3, these routes are also provided to the on-premises gateway connector router 315 and the transit gateway connector router 320. In some embodiments, these routers have the same limitations on the number of routes as the gateway router 305 because they are implemented by the same public cloud. These routes may be provided to the gateway connector routers based on routing protocol sessions between the gateway router 305 and the connector routers 315 and 320 or through the cloud provider management system in different embodiments.

The gateway router 305 also receives routes for endpoints located in other datacenters or VPCs (e.g., the on-premises datacenter 325, virtual datacenter 335, and native VPC 340) in order to route outgoing data messages sent from the local network endpoint DCNs to these other datacenters or VPCs. In some embodiments, the network management components of the virtual datacenter perform similar route aggregation processes (e.g., the operations of FIG. 4) for these routes as well so as to limit the number of routes needed by the gateway router 305. In addition, for routes to other virtual datacenters, the routes have already been aggregated by a corresponding network management component operating at that virtual datacenter and thus the received routes are already aggregated.

Figure 6:
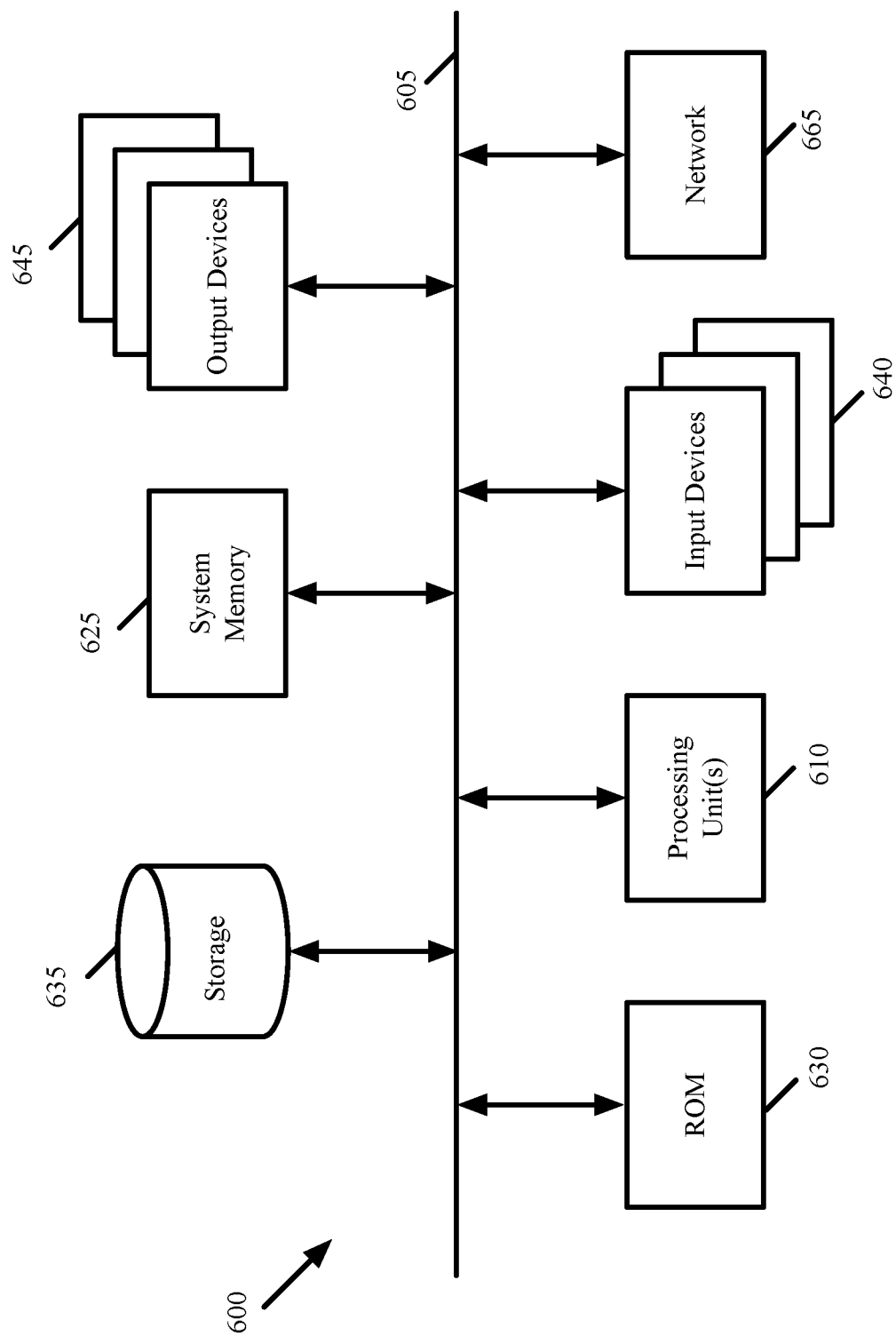
FIG. 6 conceptually illustrates an electronic system with which some embodiments of the invention are implemented.

FIG. 6 conceptually illustrates an electronic system 600 with which some embodiments of the invention are implemented. The electronic system 600 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 600 includes a bus 605, processing unit(s) 610, a system memory 625, a read-only memory 630, a permanent storage device 635, input devices 640, and output devices 645.

The bus 605 collectively represents all system, peripheral, and chipset buses that communicatively connect the numerous internal devices of the electronic system 600. For instance, the bus 605 communicatively connects the processing unit(s) 610 with the read-only memory 630, the system memory 625, and the permanent storage device 635.

From these various memory units, the processing unit(s) 610 retrieve instructions to execute and data to process in order to execute the processes of the invention. The processing unit(s) may be a single processor or a multi-core processor in different embodiments.

The read-only-memory (ROM) 630 stores static data and instructions that are needed by the processing unit(s) 610 and other modules of the electronic system. The permanent storage device 635, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 635.

Other embodiments use a removable storage device (such as a floppy disk, flash drive, etc.) as the permanent storage device. Like the permanent storage device 635, the system memory 625 is a read-and-write memory device. However, unlike storage device 635, the system memory is a volatile read-and-write memory, such a random-access memory. The system memory stores some of the instructions and data that the processor needs at runtime. In some embodiments, the invention's processes are stored in the system memory 625, the permanent storage device 635, and/or the read-only memory 630. From these various memory units, the processing unit(s) 610 retrieve instructions to execute and data to process in order to execute the processes of some embodiments.

The bus 605 also connects to the input and output devices 640 and 645. The input devices enable the user to communicate information and select commands to the electronic system. The input devices 640 include alphanumeric keyboards and pointing devices (also called "cursor control devices"). The output devices 645 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 6, bus 605 also couples electronic system 600 to a network 665 through a network adapter (not shown). In this manner, the computer can be a part of a network of computers (such as a local area network ("LAN"), a wide area network ("WAN"), or an Intranet, or a network of networks, such as the Internet. Any or all components of electronic system 600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIG. 4) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for configuring a gateway router of a virtual datacenter, the method comprising:
    at a network management component of the virtual datacenter that is defined in a public cloud and comprises (i) a set of network management components and (ii) a set of network endpoints connected by a logical network that is managed by the network management components of the virtual datacenter:
        receiving a set of network addresses of the network endpoints of the virtual datacenter;
        aggregating at least a subset of the network addresses into a single subnet address that encompasses all of the aggregated network addresses; and
        providing an aggregated route for the subset of network addresses to the gateway router that connects the virtual datacenter to a public cloud underlay network in order for the router to route data messages directed to the network endpoints to the logical network of the virtual datacenter.

2. The method of claim 1, wherein aggregating the subset of network addresses comprises determining a number of most significant bits of the network addresses for which all of the network addresses in the subset of network addresses have the same values.

3. The method of claim 2, wherein:
the single subnet address comprises (i) the values shared by all of the network addresses for the most significant bits and (ii) the value zero for each of the remaining bits; and
a netmask for the single subnet address is equal to the number of most significant bits for which all of the network addresses in the subset of network addresses have the same values.

4. The method of claim 2, wherein:
the router routes data messages directed to the network endpoints to a particular interface associated with the virtual datacenter logical network; and
the method further comprises determining that the single subnet address does not encompass any network address for which the router routes data messages to a different interface.

5. The method of claim 1, wherein the subset of the network addresses is a first subset of the network addresses for a first subset of the network endpoints, the aggregated route is a first aggregated route, wherein the method further comprises:
aggregating a second subset of the network addresses into a second subnet address that encompasses all of the network addresses in the second subset; and
providing a second aggregated route for the second subset of network addresses to the router in order for the router to route data messages directed to the second subset of network endpoints to the logical network of the virtual datacenter.

6. The method of claim 1, wherein:
the router is a first router; and
the single subnet address is provided to a second router that connects the virtual datacenter to a private datacenter of an enterprise that controls the virtual datacenter in order for data messages from network endpoints located at the private datacenter to be routed to the first router to reach the logical network of the virtual datacenter.

7. The method of claim 6 further comprising:
receiving a plurality of routes for a set of network addresses of the network endpoints located at the private datacenter; and
aggregating the plurality of routes into a single route for routing to the second router data messages directed to the network endpoints at the private datacenter.

8. The method of claim 1, wherein:
the router is a first router and the virtual datacenter is a first virtual datacenter; and
the single subnet address is provided to a second router that connects the first virtual datacenter to a second virtual datacenter in order for data messages from network endpoints located at the second virtual datacenter to be routed to the first router to reach the logical network of the virtual datacenter.

9. The method of claim 8, wherein a second subnet address for an aggregated set of network addresses of network endpoints located at the second virtual datacenter is provided to the first router in order for the first router to route data messages directed to network endpoints at the second virtual datacenter to the second router.

10. The method of claim 1, wherein the router uses a routing table with a number of entries limited by the public cloud provider.

11. The method of claim 10, wherein the number of entries is smaller than the number of network endpoints of the virtual datacenter.

12. The method of claim 1 further comprising monitoring the virtual datacenter to identify creation of new network endpoints to determine whether to aggregate the newly-created network endpoints.

13. A non-transitory machine-readable medium storing a network management component of a virtual datacenter which when executed by at least one processing unit configures a gateway router of the virtual datacenter, the virtual datacenter defined in a public cloud and comprising (i) a set of network management components and (ii) a set of network endpoints connected by a logical network that is managed by the network management components of the virtual datacenter, the network management component comprising sets of instructions for:
receiving a set of network addresses of the network endpoints of the virtual datacenter;
aggregating at least a subset of the network addresses into a single subnet address that encompasses all of the aggregated network addresses; and
providing an aggregated route for the subset of network addresses to the gateway router that connects the virtual datacenter to a public cloud underlay network in order for the router to route data messages directed to the network endpoints to the logical network of the virtual datacenter.

14. The non-transitory machine-readable medium of claim 13, wherein the set of instructions for aggregating the subset of network addresses comprises a set of instructions for determining a number of most significant bits of the network addresses for which all of the network addresses in the subset of network addresses have the same values.

15. The non-transitory machine-readable medium of claim 14, wherein:
the single subnet address comprises (i) the values shared by all of the network addresses for the most significant bits and (ii) the value zero for each of the remaining bits; and
a netmask for the single subnet address is equal to the number of most significant bits for which all of the network addresses in the subset of network addresses have the same values.

16. The non-transitory machine-readable medium of claim 14, wherein:
the router routes data messages directed to the network endpoints to a particular interface associated with the virtual datacenter logical network; and
the network management component further comprises a set of instructions for determining that the single subnet address does not encompass any network address for which the router routes data messages to a different interface.

17. The non-transitory machine-readable medium of claim 13, wherein the subset of the network addresses is a first subset of the network addresses for a first subset of the network endpoints, the aggregated route is a first aggregated route, wherein the network management component further comprises sets of instructions for:

aggregating a second subset of the network addresses into a second subnet address that encompasses all of the network addresses in the second subset; and providing a second aggregated route for the second subset of network addresses to the router in order for the router to route data messages directed to the second subset of network endpoints to the logical network of the virtual datacenter.

18. The non-transitory machine-readable medium of claim 13, wherein:

the router is a first router; and the single subnet address is provided to a second router that connects the virtual datacenter to a private datacenter of an enterprise that controls the virtual datacenter in order for data messages from network endpoints located at the private datacenter to be routed to the first router to reach the logical network of the virtual datacenter.

19. The non-transitory machine-readable medium of claim 18, wherein the network management further comprises sets of instructions for:

receiving a plurality of routes for a set of network addresses of the network endpoints located at the private datacenter; and aggregating the plurality of routes into a single route for routing to the second router data messages directed to the network endpoints at the private datacenter.

20. The non-transitory machine-readable medium of claim 13, wherein:

the router is a first router and the virtual datacenter is a first virtual datacenter; and the single subnet address is provided to a second router that connects the first virtual datacenter to a second virtual datacenter in order for data messages from network endpoints located at the second virtual datacenter to be routed to the first router to reach the logical network of the virtual datacenter.

21. The non-transitory machine-readable medium of claim 20, wherein a second subnet address for an aggregated set of network addresses of network endpoints located at the second virtual datacenter is provided to the first router in order for the first router to route data messages directed to network endpoints at the second virtual datacenter to the second router.

22. The non-transitory machine-readable medium of claim 13, wherein the router uses a routing table with a number of entries limited by the public cloud provider to a number that is smaller than the number of network endpoints of the virtual datacenter.

* * * * *